(12) United States Patent
Higashi et al.

(10) Patent No.: US 9,027,527 B2
(45) Date of Patent: May 12, 2015

(54) ANTI-VIBRATION DEVICE

(75) Inventors: Kazuma Higashi, Osaka (JP); Tomoyuki Saito, Tsuchiura (JP)

(73) Assignees: Toyo Tire & Rubber Co., Ltd., Osaka-shi (JP); Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/976,844

(22) PCT Filed: Apr. 13, 2011

(86) PCT No.: PCT/JP2011/059151
§ 371 (c)(1),
(2), (4) Date: Jun. 27, 2013

(87) PCT Pub. No.: WO2012/093502
PCT Pub. Date: Jul. 12, 2012

(65) Prior Publication Data
US 2013/0269651 A1    Oct. 17, 2013

(30) Foreign Application Priority Data
Jan. 6, 2011 (JP) .................. 2011-000947

(51) Int. Cl.
*F02B 61/04* (2006.01)
*F02B 77/13* (2006.01)
(Continued)

(52) U.S. Cl.
CPC ............. *F02B 77/13* (2013.01); *F02B 67/06* (2013.01); *F02B 67/04* (2013.01); *F02B 61/045* (2013.01);
(Continued)

(58) Field of Classification Search
CPC .......... F02B 67/06; F02B 75/22; F02B 67/04; F02B 61/045; F01L 1/00
USPC ..................................... 123/198 R
See application file for complete search history.

(56) References Cited

U.S. PATENT DOCUMENTS

2004/0232307 A1* 11/2004 Nemoto et al. .............. 248/638
2006/0226622 A1   10/2006 Trotter
2011/0193278 A1    8/2011 Kabori

FOREIGN PATENT DOCUMENTS

JP    09-177888 A    7/1997
JP    2005-059681 A    3/2005
(Continued)

OTHER PUBLICATIONS

International Search Report dated Jul. 19, 2011, issued in corresponding application No. PCT/JP2011/059151.
(Continued)

*Primary Examiner* — Lindsay Low
*Assistant Examiner* — Charles Brauch
(74) *Attorney, Agent, or Firm* — Westerman, Hattori, Daniels & Adrian, LLP

(57) ABSTRACT

An anti-vibration device according to the present invention makes it possible to achieve compactness and sufficient durability without increasing the number of parts. To be specific, an anti-vibration member 10 is made up of an inner cylinder 4, an outer ring 6, and a rubber-like elastic body 8. The outer ring 6 is disposed outside the inner cylinder 4. The outer ring 6 is attached to a frame-side member 5. An end plate 7 is provided at an outer end portion of the inner cylinder 4. The rubber-like elastic body 8 is disposed between the inner cylinder 4, the outer ring 6, and the end plate 7. The anti-vibration rubber assembly 10 is provided on each side of the frame-side member 5. A guide member 9 is interposed between the two inner cylinders 4 and is unified therewith. The inner cylinder 4 is attached to an engine-side bracket 3. The guide member 9 faces the outer ring 6 in the radial direction and guides the inner cylinder 4 in the up-and-down direction. Damage of the rubber-like elastic body 8 due to displacement in the horizontal direction is prevented while an engine 2 is elastically supported thereby suppressing vibration.

9 Claims, 17 Drawing Sheets

(51) Int. Cl.
  *F16F 15/08* (2006.01)
  *F16F 1/373* (2006.01)
  *B60K 5/12* (2006.01)
  *F02B 67/06* (2006.01)
  *F02B 67/04* (2006.01)
  *F01L 1/00* (2006.01)
  *F02B 75/22* (2006.01)
  *B60K 5/04* (2006.01)

(52) U.S. Cl.
  CPC .. *F01L 1/00* (2013.01); *F02B 75/22* (2013.01); *F16F 15/08* (2013.01); *F16F 1/3735* (2013.01); *F16F 2230/0058* (2013.01); *B60K 5/04* (2013.01); *B60K 5/1208* (2013.01); *B60K 5/1216* (2013.01)

(56) References Cited

FOREIGN PATENT DOCUMENTS

| | | |
|---|---|---|
| JP | 2006-220261 A | 8/2006 |
| JP | 2009-236228 A | 10/2009 |
| WO | 2010041749 A1 | 4/2010 |

OTHER PUBLICATIONS

Office Action dated Jul. 2, 2014, issued in corresponding to Korean Patent Application No. 10-2013-7019648, with English Translation (10 pages)

\* cited by examiner (a)

(b)

HORIZONTAL LOAD vs HORIZONTAL DISPLACEMENT

UP-AND-DOWN LOAD vs UP-AND-DOWN DISPLACEMENT (a)

(b)

(c)

ANTI-VIBRATION DEVICE

TECHNICAL FIELD

The present invention relates to an anti-vibration device for suppressing vibration of an engine equipped on, for example, a construction machine.

BACKGROUND ART

In general, an engine equipped on a construction machine, etc. is elastically supported via an anti-vibration device having a rubber-like elastic body to suppress the vibration generated by the engine itself and the vibration of the engine caused by the vibration of a vehicular body while travelling on a rough surface and drilling operation.

An anti-vibration apparatus is commonly configured to combine a pair of anti-vibration devices for vertically supporting the engine, and a pair of anti-vibration devices for obliquely supporting the engine, thereby supporting the engine at 4 points. The anti-vibration apparatus is configured such that the anti-vibration device for vertical support elastically supports the engine, which is a vibrating heavy object, effectively in the vertical direction, and the anti-vibration device for oblique support bears horizontal forces associated with the vibration of the engine, in addition to vertical forces.

However, the anti-vibration device for vertical support cannot sufficiently bear horizontal forces, and therefore, as the result of the engine as a whole vibrating in a direction to horizontally pivot around the position of the anti-vibration device for oblique support, the anti-vibration device for vertical support is significantly displaced in the shear direction (horizontal direction). The displacement in the shear direction of the anti-vibration device for vertical support is likely to cause a crack in the rubber-like elastic body, and to prevent such a crack thereby improving durability, the anti-vibration device for vertical support needs to be increased in size.

With regard to this, as shown in FIG. 17, Patent Literature 1 discloses an anti-vibration apparatus whereby an engine 104 is supported by a pair of anti-vibration devices for vertical support 101 and two pairs of anti-vibration devices for oblique support 102, 103, and further, the anti-vibration device for vertical support 101 is disposed near the center of gravity of the engine 104. The anti-vibration apparatus of Patent Literature 1 can prevent the anti-vibration device for vertical support 101 from being significantly deformed in the shear direction even if the engine 104 vibrates in the direction to horizontally pivot around the center of gravity thereof.

CITATION LIST

Patent Literature

Patent Literature 1: Japanese Patent Laid-Open No. 2005-59681 (Paragraphs 0038, 0047, 0056, 0063 and FIGS. 5 to 7)

SUMMARY OF INVENTION

Technical Problem

Incidentally, the anti-vibration apparatus disclosed in Patent Literature 1 can improve its durability while configuring individual anti-vibration devices to be compact.

However, since the anti-vibration apparatus of Patent Literature 1 supports the engine at 6 points, the number of parts increases compared with a case of 4-point support, thereby leading to an increase in the number of man-hours for assembling as well as in the mounting space as a whole.

The present invention has its object to provide an anti-vibration device which can achieve compactness and sufficient durability without increasing the number of parts.

Solution to Problem

To achieve the above-described object, an anti-vibration device according to the present invention includes: an inner cylinder attached to an engine-side member; an outer ring disposed outside the inner cylinder and attached to a frame-side member; an end plate provided at an end portion of the inner cylinder; and a rubber-like elastic body disposed between the inner cylinder, the outer ring, and the end plate, wherein a guide member is provided in one of the inner cylinder and the outer ring so as to face the other in the radial direction and guide the inner cylinder in a direction of the central axis thereof.

According to the above-described configuration, since the guide member for guiding the inner cylinder in the direction of the central axis thereof is provided, it is possible to restrict the displacement of the inner cylinder in the direction normal to the central axis thereof while allowing the displacement of the inner cylinder in the direction of the central axis thereof. As a result of this, it becomes possible to prevent the rubber-like elastic body from being damaged due to displacement in the direction normal to the central axis thereof while elastically supporting the engine and suppressing the vibration of the engine, and to achieve a reduced size and a sufficient durability of the anti-vibration device without increasing the number of parts.

It is noted that although providing the guide member will restrict the displacement of the inner cylinder in the direction normal to the central axis thereof, it is possible to sufficiently suppress the vibration generated by the engine itself by elastically supporting the engine in the direction of the central axis of the inner cylinder. Further, by aligning the direction of the central axis of the inner cylinder with the direction in which strong forces act such as the up-and-down direction, it is possible to suppress a majority of the vibration of engine caused by the vibration of a vehicular body during travelling and drilling operation.

Further, it is also possible to adopt a configuration in which two anti-vibration member, each of which is made up of the inner cylinder, the outer ring, and the rubber-like elastic body, are provided on both sides of the frame-side member, and the two anti-vibration member are unified with the end plate being provided at an outer end portion of each inner cylinder, and with the guide member, which is formed separately therefrom, being interposed between both the inner cylinders.

According to this configuration, since the anti-vibration member are provided on both the sides of the frame-side member, it is possible to suppress the vibration of the engine at both times of bounding and rebounding. Further, since the guide member is formed into a separate body, the anti-vibration device is less likely to be subject to constraints in manufacturing such as in the vulcanization of the rubber-like elastic body, thereby allowing to increase the degree of freedom in design.

It is possible to make the guide member, which is formed into a separate body, exhibit the function as a guide member by interposing it between both the inner cylinders, and thereby disposing it inside the outer ring. Furthermore, since the outer ring covers the circumference of the guide member, it is possible to inhibit the guide member from falling down when the anti-vibration device is mounted while being assembled, thereby improving the ease of assembly of the anti-vibration device.

Moreover, when the guide member is formed into a separate body, it is also possible to adopt a configuration in which a step which is to be engaged with the end portion of the inner cylinder is formed at a peripheral edge portion of the guide member.

According to this configuration, since the step formed at the peripheral edge portion of the guide member can be engaged with the end portion of the inner cylinder, it is possible to inhibit the guide member from being deviated when assembling the anti-vibration device, thereby improving the ease of assembly of the anti-vibration device. Furthermore, after the anti-vibration device has been assembled, it is possible to inhibit the guide member from being disengaged from the end portion of the inner cylinder due to a reactive force applied from the outer ring, thereby securely guiding the inner cylinder in the direction of the central axis thereof.

Moreover, it is also possible to adopt a configuration in which a gap which allows movement of the inner cylinder in the direction normal to the central axis thereof is provided between the guide member and the outer ring.

According to this configuration, since the gap is provided between the guide member and the outer ring, the inner cylinder can be moved in the direction normal to the central axis thereof within the size of the gap so that the anti-vibration device can be placed with ease between the engine-side member and the frame-side member. The size of the gap between the guide member and the outer ring can be appropriately set within a range in which the rubber-like elastic body will not be damaged by the movement of the inner cylinder, allowing to absorb dimensional errors, etc. of each part and member to a satisfactory level.

Moreover, it is also possible to adopt a configuration in which the end plate is provided with a tubular portion protruding from a peripheral edge portion thereof toward an outer periphery side of the rubber-like elastic body, and a gap is provided between the tubular portion and the rubber-like elastic body.

According to this configuration, since there is provided the gap between the tubular portion protruding from the end plate and the rubber-like elastic body, it is possible to release a portion of the rubber-like elastic body into the gap between the tubular portion and the rubber-like elastic body when compressively deforming the rubber-like elastic body in the direction of the central axis, thereby decreasing the rigidity of the anti-vibration device. Furthermore, after the gap between the tubular portion and the rubber-like elastic body is closed by the compressive deformation of the rubber-like elastic body, it is possible to increase the rigidity of the anti-vibration device because a space into which the rubber-like elastic body which is further compressively deformed is released is closed. Therefore, it is possible to make the anti-vibration device have various spring characteristics by appropriately adjusting the size of the gap between the tubular portion and the rubber-like elastic body, thereby increasing the degree of freedom in the design of the anti-vibration device.

Further, it is also possible to adopt a configuration in which the tubular portion is placed at a position where its front end overlaps the outer ring in the radial direction of the inner cylinder, and is made to act as a stopper which comes into abutment with the outer ring to limit the movement of the inner cylinder in the direction of the central axis thereof.

According to this configuration, it is possible to limit the movement of the inner cylinder in the direction of the central axis thereof by bringing the front end of the tubular portion, which protrudes from the end plate at the end portion of the inner cylinder, into abutment with the outer ring when the inner cylinder is excessively deformed in the direction of the central axis thereof. Furthermore, since the front end of the tubular portion is placed at a position where it overlaps with the outer ring in the radial direction, it is possible to inhibit the tubular portion from coming into direct abutment with the frame-side member, thereby preventing rusting due to peeling-off of paint and structural damages of the frame-side member.

Moreover, the above-described outer ring may be exemplified by a circular disc shaped and a cylinder shaped ones, and further, when an outer cylinder is adopted as the outer ring, the end plate can be omitted.

That is, the present invention provides an anti-vibration device, including: an inner cylinder attached to an engine-side member; an outer cylinder disposed outside the inner cylinder and attached to a frame-side member; and a rubber-like elastic body disposed between the inner cylinder and the outer cylinder, wherein a guide member is provided in one of the inner cylinder and the outer cylinder so as to face the other in a radial direction and guide the inner cylinder in a direction of a central axis thereof.

Advantageous Effects of Invention

As so far described, according to the present invention, since the guide member for guiding the inner cylinder in the direction of the central axis thereof is provided, it is possible to prevent the rubber-like elastic body from being damaged due to displacement in the direction normal to the central axis thereof while elastically supporting the engine and thereby suppressing the vibration thereof. As a result of this, each anti-vibration device can be configured to be compact and to have a sufficient durability, and the number of the anti-vibration devices for supporting the engine of a construction machine, etc. can be reduced to, for example, four, thus making it possible to decrease the total number of the parts, and thus the number of man-hours as well as to reduce the mounting space as a whole.

BRIEF DESCRIPTION OF DRAWINGS

FIG. 1 is a perspective view showing a state in which an anti-vibration device according to the present invention is mounted on a bracket.

FIG. 2 shows (a) a view seen from the side of an engine, and (b) a view seen from the front of the engine, in a layout drawing of the anti-vibration device.

FIG. 3 is a perspective exploded view of the anti-vibration device.

FIG. 4 is a cross-sectional view of the anti-vibration device.

FIG. 5 is a perspective view of an anti-vibration member.

FIG. 6 is a side view of the anti-vibration member.

FIG. 7 is a plan view of the anti-vibration member.

FIG. 8 is a cross-sectional view of the anti-vibration member.

FIG. 9 is a perspective view of a guide member.

FIG. 10 is a side view of the guide member.

FIG. 11 is a plan view of the guide member.

FIG. 12 is a cross-sectional view of the guide member.

FIG. 13 shows a procedure to mount the anti-vibration device between a frame-side bracket and an engine-side bracket.

FIG. 14 shows a state of disposing the guide member.

FIG. 15 shows a relationship between load and displacement in the direction normal to the central axis of the inner cylinder.

FIG. 16 shows a relationship between load and displacement in the direction of the central axis of the inner cylinder.

FIG. 17(a)-(c) are cross-sectional views showing a layout of a conventional anti-vibration apparatus.

DESCRIPTION OF EMBODIMENT

Figure 1:
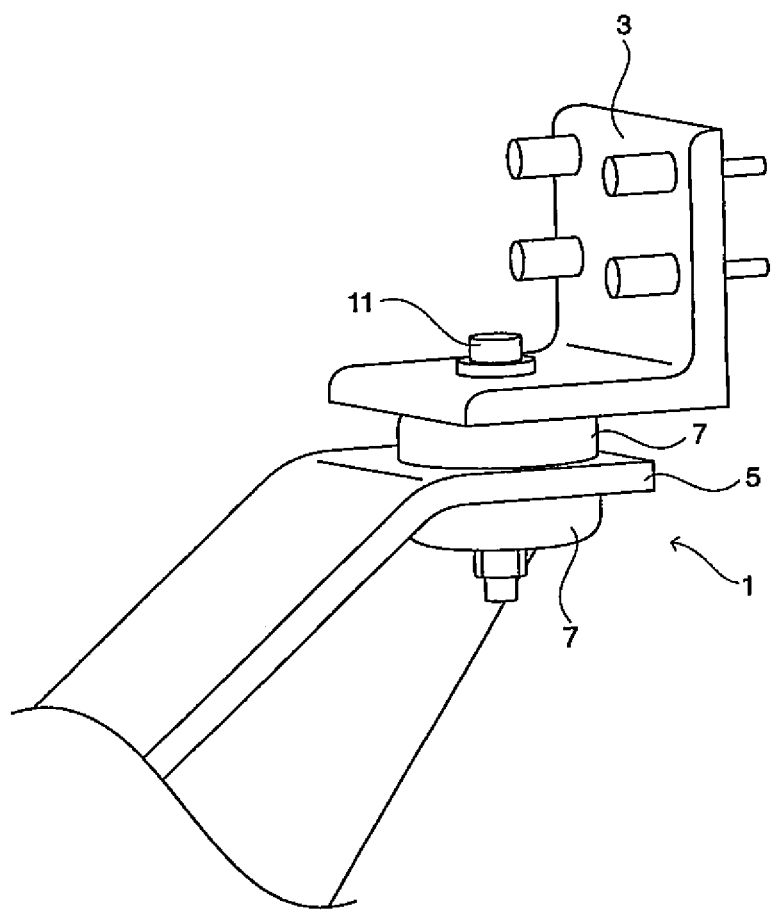
[FIG. 1]
Figure 2:
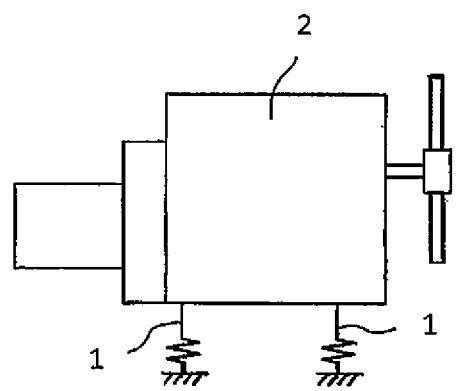
[FIG. 2]
Figure 2:
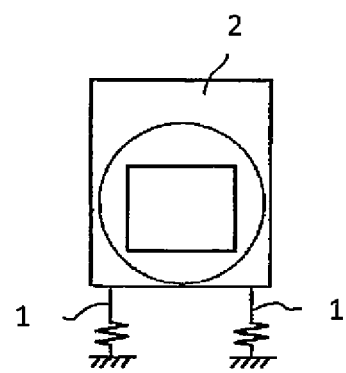
Figure 3:
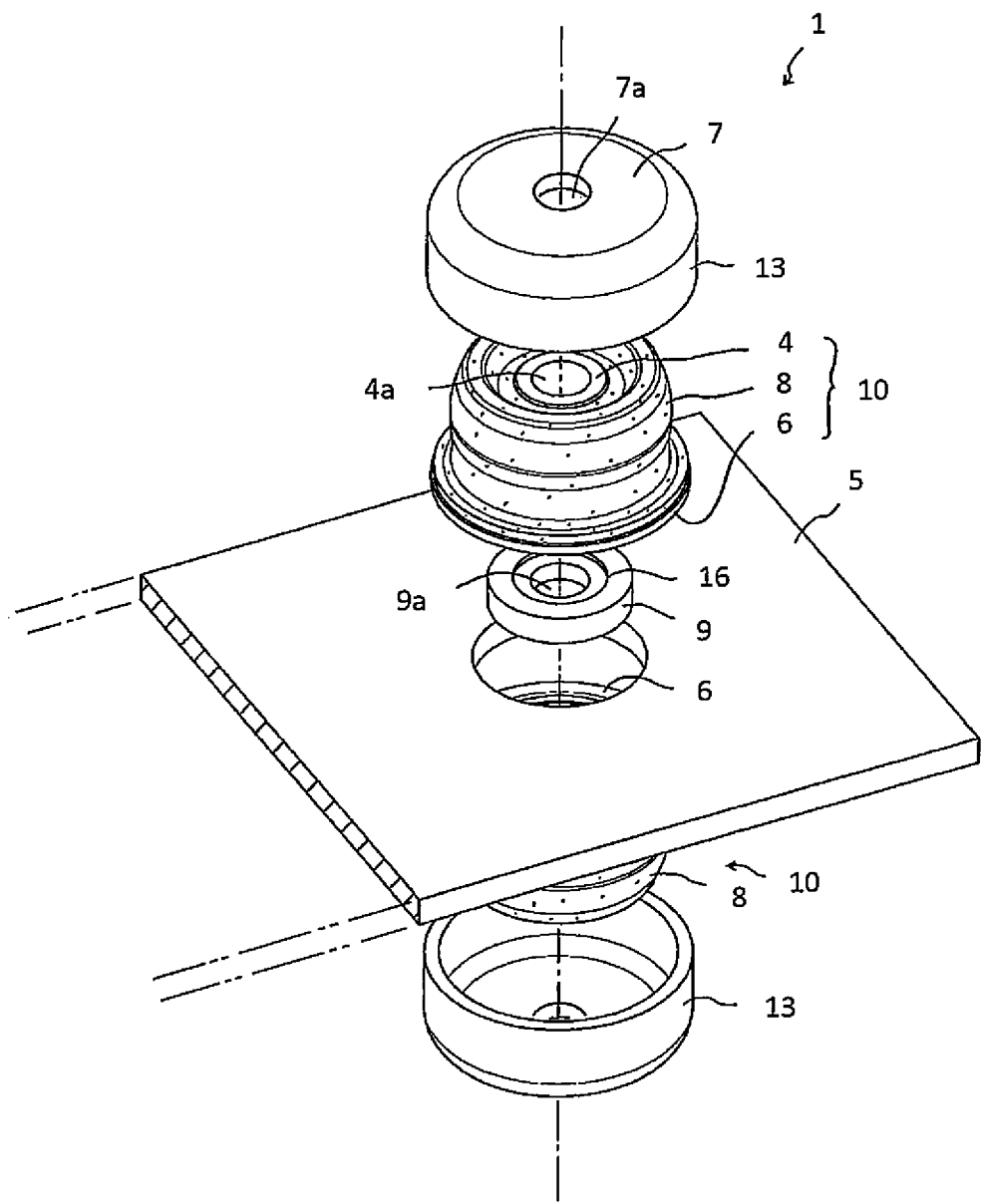
[FIG. 3]
Figure 4:
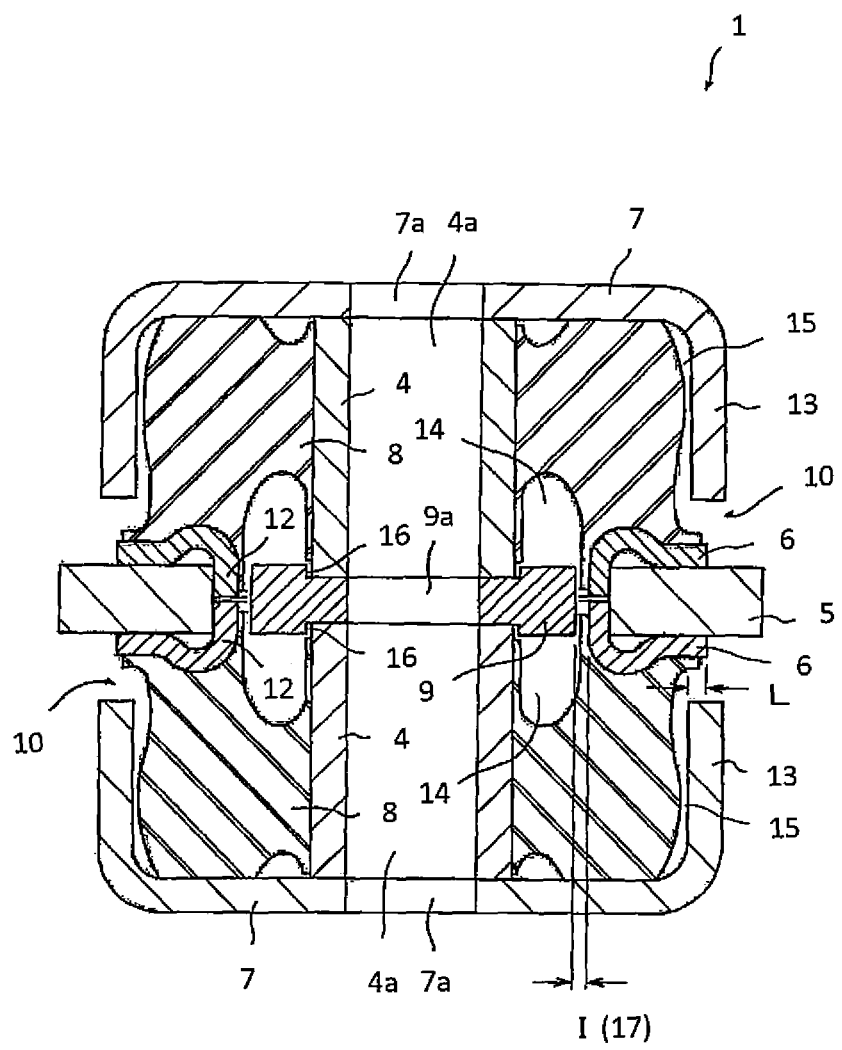
[FIG. 4]
Figure 5:
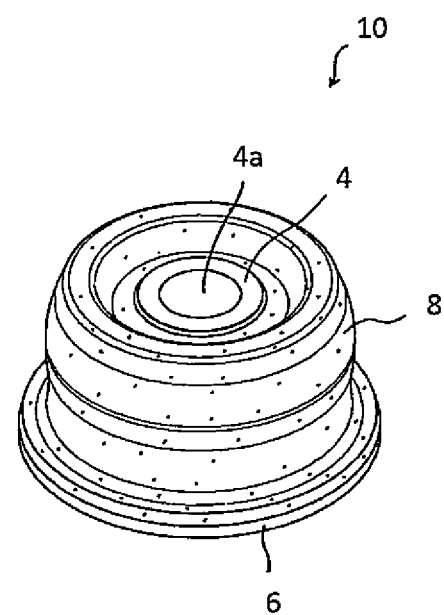
[FIG. 5]
Figure 6:
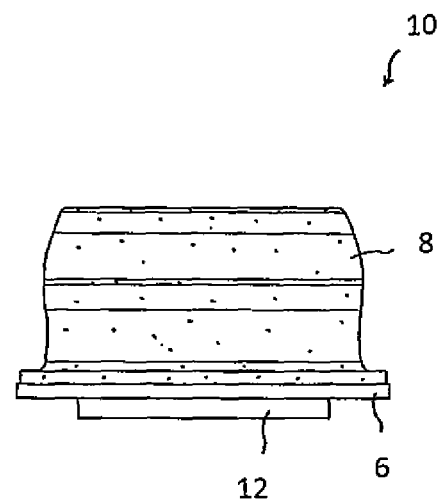
[FIG. 6]
Figure 7:
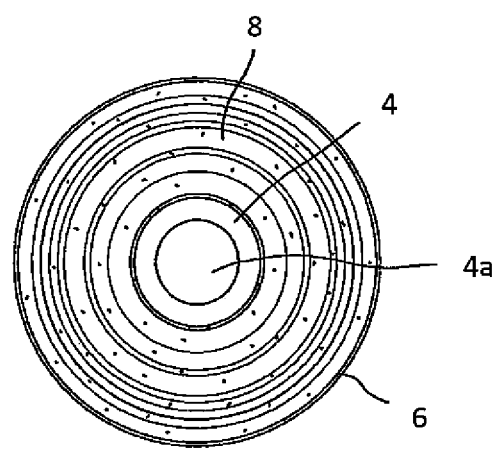
[FIG. 7]
Figure 8:
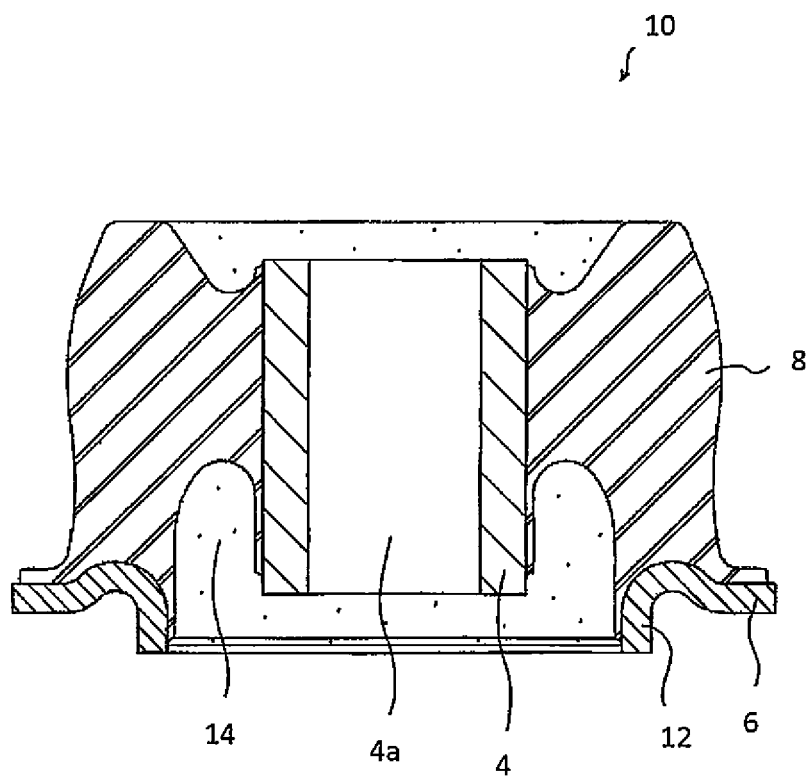
[FIG. 8]
Figure 9:
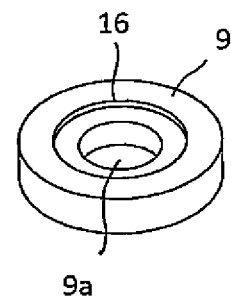
[FIG. 9]
Figure 10:
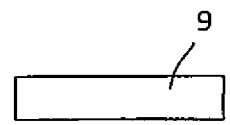
[FIG. 10]
Figure 11:
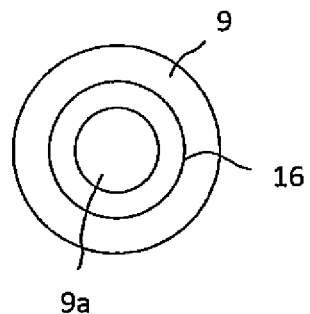
[FIG. 11]
Figure 12:
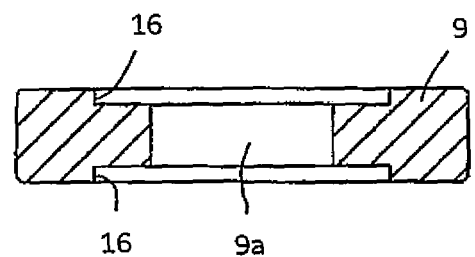
[FIG. 12]

Hereafter, an embodiment for implementing an anti-vibration device according to the present invention will be described by using the drawings.

As shown in FIGS. 1 to 4, an anti-vibration device 1, which is for the purpose of elastically supporting an engine 2 equipped on a construction machine, etc. in the vertical direction, for example, at 4 points, thereby suppressing vibration of the engine, includes an inner cylinder 4 which is attached to an engine-side bracket 3 as an engine-side member, an outer ring 6 which is disposed outside the inner cylinder 4 and is attached to a frame-side bracket 5 as a frame-side member, an end plate 7 provided at an outer end portion of the inner cylinder 4, a rubber-like elastic body 8 which is disposed between the inner cylinder 4, the outer ring 6, and the end plate 7, and a guide member 9 which faces the outer ring 6 in the radial direction and guides the inner cylinder 4 in the direction of the central axis thereof.

As shown in FIGS. 1 to 8, the anti-vibration device 1 is configured such that an anti-vibration member 10 made up of the inner cylinder 4, the outer ring 6, and the rubber-like elastic body 8 is provided on each side of the frame-side bracket 5, and the two anti-vibration members 10 are unified so as to hold the frame-side bracket 5 therebetween. The two anti-vibration members 10 are unified by providing the end plate 7 at the outer end portion of each of the both inner cylinders 4, interposing the guide member 9, which is formed separately therefrom, between both the inner cylinders 4, and inserting a bolt 11 through central holes of both the inner cylinders 4 to fasten it in the direction of the central axis.

By providing the anti-vibration member 10 on each side of the frame-side bracket 5, it is possible to support the engine 2 in association with compression of either of the upper and lower anti-vibration member 10, either at the time of bounding or at the time of rebounding.

The inner cylinders 4, each of which is configured to be straight tube-shaped and is made of metal, are disposed with the directions of the central axis thereof being aligned in the up-and-down direction so as to move in the up-and-down direction along with the end plates 7 disposed at the outer end portions thereof as the engine 2 vibrates.

The outer ring 6, which is made of, for example, metal such as a cold rolled steel sheet and is formed into a ring shape having an L-shaped cross-section and having a tubular portion 12 at an inner peripheral edge thereof, is attached to each of the upper and lower surfaces of the frame-side bracket 5 with the tubular portion 12 thereof being fitted into an attachment hole of the frame-side bracket 5.

The end plate 7 is made of, for example, metal, and formed into a disk shape having a central hole 7a of substantially the same diameter as that of a central hole 4a of the inner cylinder 4; and a tubular portion 13, which protrudes toward an outer periphery side of the rubber-like elastic body 8, is formed at a peripheral edge portion of the end plate 7. The tubular portion 13 is placed at a position where its front end overlaps an outer peripheral portion of the outer ring 6 in the radial direction of the inner cylinder 4, and acts as a stopper which comes into abutment with the outer ring 6 to restrict the movement of the inner cylinder 4 in the direction of the central axis. Since the front end of the tubular portion 13 comes into abutment with the outer ring 6 when it acts as a stopper, it is possible to inhibit the tubular portion 13 from coming into direct contact with the frame-side bracket 5 so that rusting of the frame-side bracket 5 due to peeling-off of paint and structural damages thereof will not occur.

The rubber-like elastic body 8, which is formed into a ring shape and is made of, for example, heat resistant natural rubber, is configured to elastically deform in the direction of the central axis between the outer ring 6 and the end plate 7 as the inner cylinder 4 and the end plate 7 move. The rubber-like elastic body 8, in which an inner peripheral surface thereof is bonded by vulcanization to an outer peripheral surface of the inner cylinder 4, as well as an end surface on an inner end side of the rubber-like elastic body 8 is bonded by vulcanization to a surface of the outer ring 6, is unified with the inner cylinder 4 and the outer ring 6 to constitute the anti-vibration member 10. It is noted that since the guide member 9 is formed into a separate body, the shape of the rubber-like elastic body 8 can be freely determined without being restricted by the assembly of its vulcanization mold.

The rubber-like elastic body 8 is formed into a size in which both end surfaces thereof protrude in the direction of the central axis further than both the ends of the inner cylinder 4 in its free state (see FIGS. 5 to 8), and is configured to be pre-compressed in the direction of the central axis between the frame-side bracket 5 and the end plate 7 when the two anti-vibration members 10 are fastened with the bolt 11 to be unified. Since both the end surfaces of the rubber-like elastic body 8 are configured to protrude further than the inner cylinder 4, the pre-compression of the rubber-like elastic body 8 is distributed to both sides, making it possible to obtain a sufficient pre-compression amount while reducing shear strain in the direction of the central axis.

A slit 14, which is continuous in the circumferential direction, is formed concavely on both the end surfaces of the rubber-like elastic body 8, and the shape of the slit 14 is appropriately specified such that the rubber-like elastic body 8 has predetermined spring and strain characteristics. The outer diameter of the slit 14 is specified to be larger than the outer diameter of the guide member 9 within a moving range of the guide member 9 defined by the tubular portion 13 of the end plate 7 to prevent contact between the rubber-like elastic body 8 and the guide member 9 when the inner cylinder 4 moves in the direction of its central axis along with the guide member 9.

A gap 15 is provided between an outer peripheral surface of the rubber-like elastic body 8 and the tubular portion 13 of the end plate 7, thereby allowing the rubber-like elastic body 8, which has been compressed in the direction of the central axis as the inner cylinder 4 and the end plate 7 moved, to expand in the radial direction. The gap 15 is closed by the rubber-like elastic body 8 being sufficiently compressed, thereby restricting the expansion of the rubber-like elastic body 8 in the radial direction against further movement of the inner cylinder 4 and the end plate 7 to increase the rigidity of the anti-vibration device 1. This makes it possible to appropriately specify the size of the gap 15 such that the anti-vibration device 1 has various spring characteristics, thus increasing the degree of freedom in the design of the anti-vibration device 1.

As shown in FIGS. 1 to 12, the guide member 9, which is made of, for example, metal such as carbon steel and is formed into a ring shape having a central hole 9a of substantially the same diameter as that of the central hole 4a of the inner cylinder 4, is provided in its peripheral edge portion with a step 16 which is to be engaged with the end portion of the inner cylinder 4. The size of the step 16 is set to be, for example, not less than about 1 mm, and the guide member 9 is unified with the inner cylinders 4 of the two anti-vibration rubber assemblies 10 by engaging the step 16 with the end portion of the inner cylinder 4 and inserting the bolt 11 through each of the central holes 7a, 4a, and 9a of both the end plates 7, both the inner cylinders 4 and the guide member 9 and fastening it.

The guide member 9 is configured to have a thickness larger than the plate thickness of the frame-side bracket 5, face the tubular portion 12 of the outer ring 6 in the radial direction to guide the inner cylinder 4 in the direction of the central axis thereof. This will restrict the movement of the inner cylinder 4 in the horizontal direction without impairing the movement of the inner cylinder 4 in the direction of the central axis thereof, and prevent damage of the rubber-like elastic body 8 due to shear-deformation in the horizontal direction, thereby improving the durability of the anti-vibration device 1.

A gap 17 which allows the movement of the inner cylinder 4 in the direction normal to the central axis thereof is provided between the guide member 9 and the outer ring 6 so that dimensional errors of each member and part are absorbed when assembling the anti-vibration device 1 to the frame-side bracket 5. The size (I) of the gap 17 is set to be smaller than a lap length (L) between the outer peripheral portion of the outer ring 6 and the tubular portion 13 of the end plate 7, thereby inhibiting the front end of the tubular portion 13 from being shifted in the horizontal direction from the position overlapping the outer ring 6 to come into direct contact with the frame-side bracket 5.

Moreover, the guide member 9 is formed of a material different from that of the outer ring 6, thereby preventing adhesion and wear between the two. Further, the peripheral edge portion of the guide member 9 is rounded or chamfered to prevent damage of the rubber-like elastic body 8 and the outer ring 6.

Next, the procedure to mount the anti-vibration device between the fame-side bracket and the engine-side bracket will be described.

Figure 13:
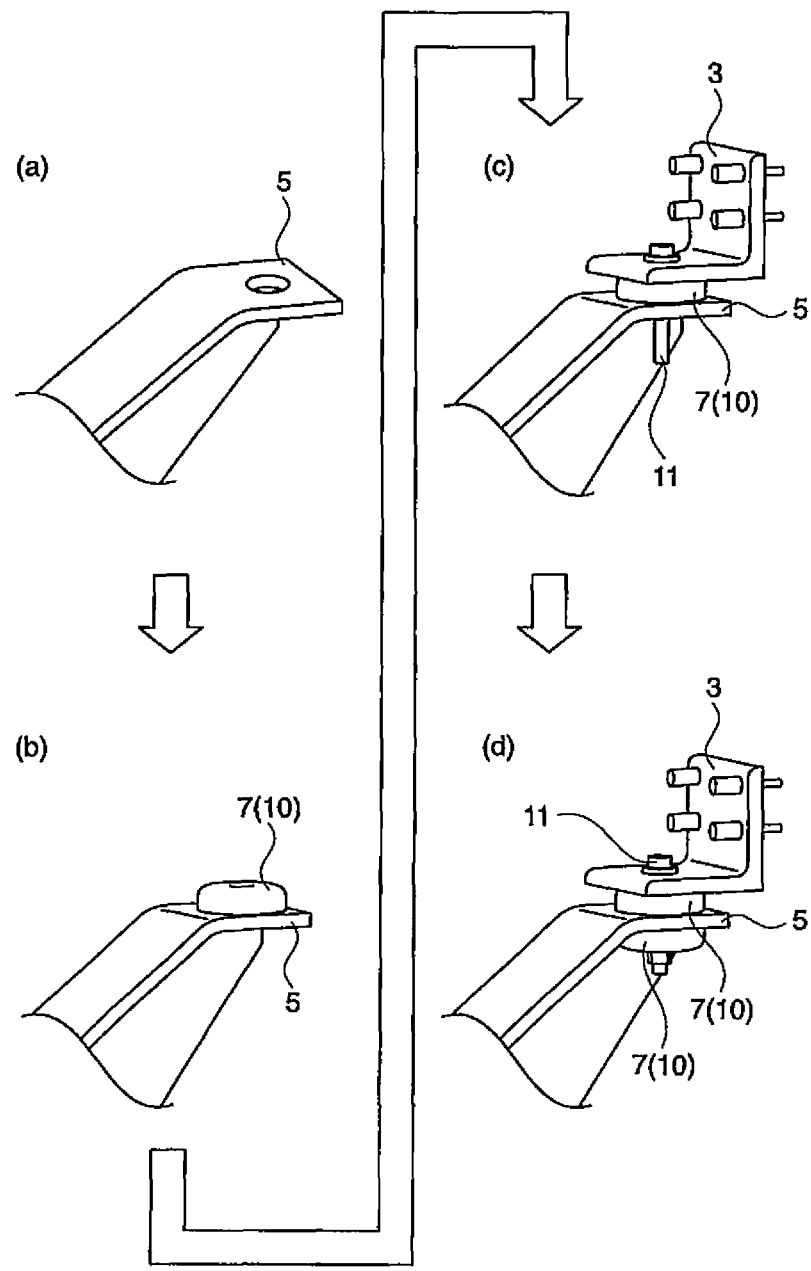
[FIG. 13]

As shown in FIG. 13, first, the tubular portion 12 of the outer ring 6 is fitted into the attachment hole of the frame-side bracket 5 from the upper surface side, thereby attaching the upper side anti-vibration member 10 to the upper surface side of the frame-side bracket 5, and the end plate 7 is fitted on the anti-vibration member 10 (see FIGS. 13(a) and 13(b)).

Next, the engine-side bracket 3 is placed on the end plate 7, and the bolt 11 is inserted through a bolt hole of the engine-side bracket 3 and the central holes 7a and 4a of the end plate 7 and the inner cylinder 4 from upward (see FIG. 13(c)).

Figure 14:
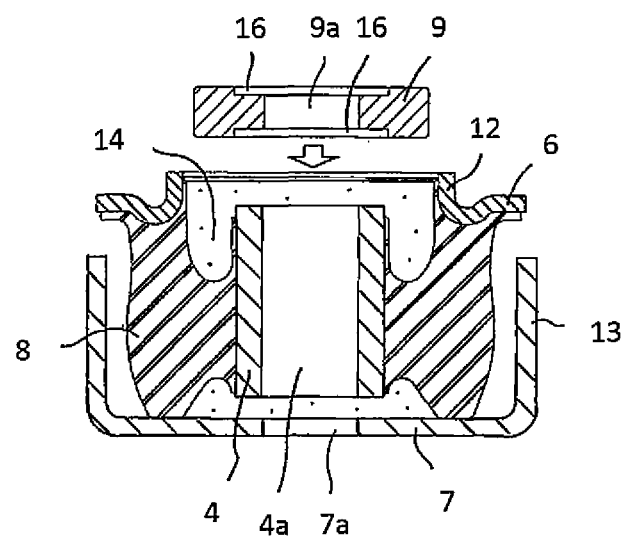
[FIG. 14]

The anti-vibration member 10 is put on top of the end plate 7 of lower side, and further, the guide member 9 is set to be superposed thereon such that the step 16 engages with the inner cylinder 4 of the anti-vibration member 10. Since the guide member 9 is a nondirectional structure which is circular and vertically symmetrical, and moreover, the circumference of the guide member 9 is surrounded by the tubular portion 12 of the outer ring 6, thereby inhibiting the guide member 9 from slipping off, it is possible to improve the ease of assembly of the anti-vibration device 1 (see FIG. 14).

The bolt 11, which protrudes toward the lower surface side of the frame-side bracket 5, is inserted through the central holes 7a, 4a, and 9a of the end plate 7, the inner cylinder 4 and the guide member 9 which have been set, and the bolt 11 is fastened with a nut, thereby completing the mounting of the anti-vibration device 1 (see FIG. 13(d)).

According to the above-described configuration, since the guide member 9 is provided in the anti-vibration device 1 to limit the movement of the inner cylinder 4 in the horizontal direction without impairing the movement of the inner cylinder 4 in the up-and-down direction, it is possible to prevent damage of the rubber-like elastic body 8 due to shear deformation in the horizontal direction. As a result of this, it is possible to elastically support the engine 2, which is equipped on a construction machine, etc., and improve the durability of the anti-vibration device 1 while suppressing the vibration generated by the engine 2 itself and the vibration of the engine 2 caused by the vibration of a vehicular body while travelling on a rough surface and drilling operation.

Moreover, since the gap 17 is provided between the guide member 9 and the outer ring 6, it is possible to absorb dimensional errors of each member and part, facilitating the assembling of the anti-vibration device 1 to the frame-side bracket 5.

Figure 15:
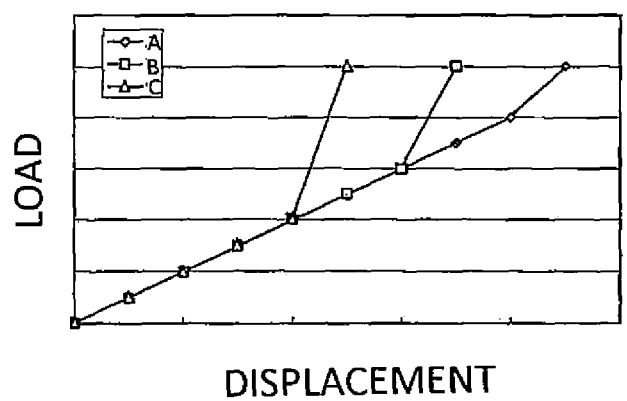
[FIG. 15]

FIG. 15 is a diagram showing by an example the relationship between the load acting on the inner cylinder 4 in the horizontal direction and the horizontal displacement of the inner cylinder 4, in which the ordinate indicates the load acting on the inner cylinder 4 in the horizontal direction and the abscissa indicates the horizontal displacement of the inner cylinder 4. FIG. 15 shows the relationship among three kinds of the guide members 9 having different outer diameters with the inner diameter of the outer ring 6 being kept constant, in which the outer diameters of the guide member 9 are specified to be smaller in the order of (A), (B), and (C) ($\phi A < \phi B < \phi C$).

As shown in FIG. 15, by providing the gap 17, it is made possible to decrease the rigidity of the anti-vibration device 1 in the horizontal direction within a range in which the horizontal displacement is small so that the inner cylinder 4 can be easily displaced in the horizontal direction and dimensional errors, etc. of each member and part can be absorbed. Further, after the horizontal displacement has increased thereby closing the gap 17, the rigidity of the anti-vibration device 1 in the horizontal direction increases so that further displacement in the horizontal direction is restricted. The size of the gap 17 can be appropriately specified taking the interference, etc. of each part into account.

Moreover, since the gap 15 is provided between the outer peripheral surface of the rubber-like elastic body 8 and the tubular portion 13 of the end plate 7, the rigidity of the anti-vibration device 1 can be changed between the state in which the gap 15 remains and the state in which the compression amount of the rubber-like elastic body 8 is large and the gap 15 is closed. This makes it possible to make the anti-vibration device 1 have various spring characteristics, thereby increasing the degree of freedom in the design of the anti-vibration device 1.

Figure 16:
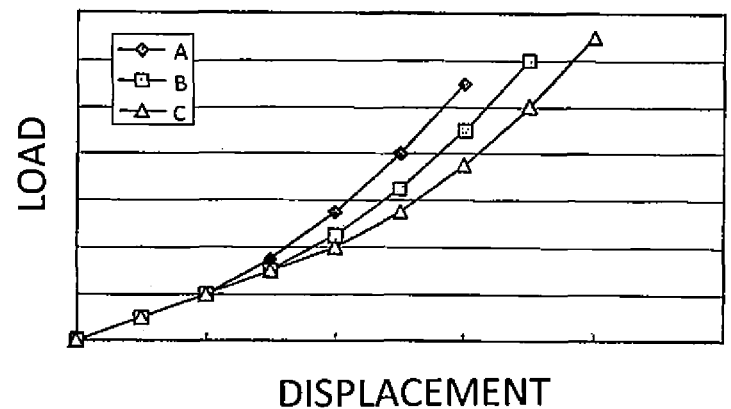
[FIG. 16]
Figure 17:
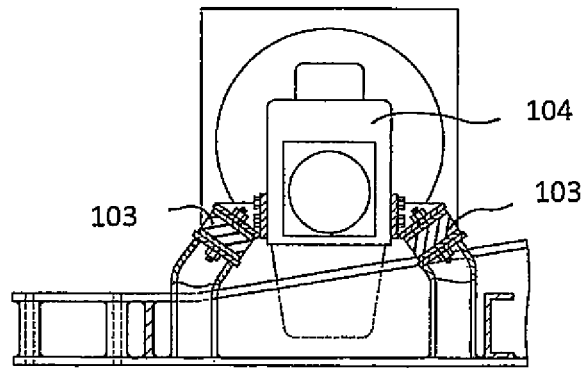
[FIG. 17]
Figure 17:
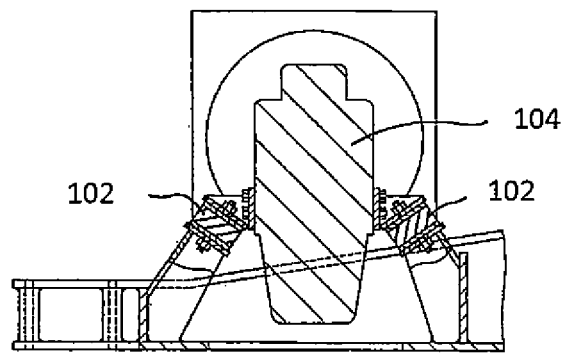
Figure 17:
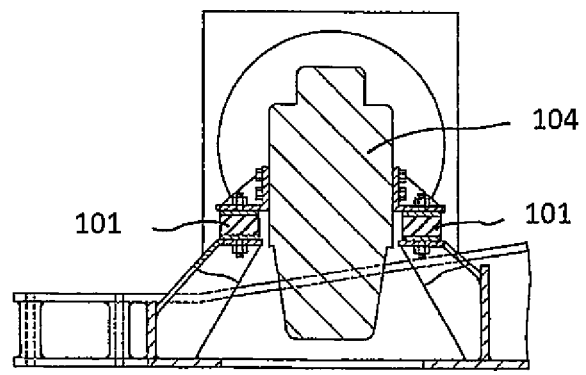

FIG. 16 is a diagram showing by an example the relationship between the load acting on the inner cylinder 4 in the up-and-down direction and the up-and-down displacement of the inner cylinder 4, in which the ordinate indicates the load acting on the inner cylinder 4 in the up-and-down direction and the abscissa indicates the up-and-down displacement of the inner cylinder 4. FIG. 16 shows the relationship among three kinds of the rubber-like elastic bodies 8 having different outer diameters with the inner diameter of the tubular portion 13 being kept constant, in which the outer diameters of the rubber-like elastic body 8 are specified to be larger in the order of (A), (B), and (C) ($\phi A > \phi B > \phi C$).

As shown in FIG. 16, by providing the gap 15, it is made possible to decrease the rigidity of the anti-vibration device 1 in the up-and-down direction within a range in which the up-and-down displacement is small, and after the up-and-down displacement has increased thereby closing the gap 15, it is made possible to increase the rigidity of the anti-vibration device 1 in the up-and-down direction.

It is noted that the present invention will not be limited to the above-described embodiment, and can be appropriately modified within the scope of the present invention. For example, the configuration may be such that not only the rubber-like elastic body 8 is disposed between the inner cylinder 4, the outer ring 6, and the end plate 7, but also an outer cylinder in place of the outer ring 6 having an L-shaped cross section is disposed and a rubber-like elastic body may be disposed between the inner cylinder and the outer cylinder omitting the end plate 7. In this case, the rubber-like elastic body transmits force while undergoing shear deformation in the direction of the central axis between the inner cylinder and the outer cylinder.

Moreover, instead of providing the guide member 9 in the inner cylinder 4, it is also possible to adopt a configuration in which the guide member is provided in the outer ring and the outer cylinder.

INDUSTRIAL APPLICABILITY

The anti-vibration device according to the present invention can be suitably adopted for applications in which the device is mounted on, for example, a construction machine to suppress the vibration of the engine.

REFERENCE SIGNS LIST

1 Anti-vibration device
2 Engine
3 Engine-side bracket
4 Inner cylinder
4*a* Central hole
5 Frame-side bracket
6 Outer ring
7 End plate
7*a* Central hole
8 Rubber-like elastic body
9 Guide member
9*a* Central hole
10 Anti-vibration member
11 Bolt
12 Tubular portion
13 Tubular portion
14 Slit
15 Gap
16 Step
17 Gap

The invention claimed is:

1. An anti-vibration device, comprising: an inner cylinder attached to an engine-side member; an outer ring disposed outside the inner cylinder and attached to a frame-side member; an end plate provided at an end portion of the inner cylinder; and a rubber-like elastic body disposed between the inner cylinder, the outer ring, and the end plate, wherein a guide member is coaxially provided to one of the inner cylinder and the outer ring so as to face and abut the other at least in part thereof in a radial direction normal to a central axis of the inner cylinder and guide the inner cylinder in a direction of the central axis when the inner cylinder moves as the engine-side member of an engine vibrates.

2. The anti-vibration device according to claim 1, wherein two anti-vibration rubber assemblies, each of which is made up of the inner cylinder, the outer ring, and the rubber-like elastic body, are provided on both sides of the frame-side member, and the two anti-vibration rubber assemblies are unified with the end plate being provided at an outer end portion of the inner cylinder, and with the guide member, which is formed separately therefrom, being interposed between both the inner cylinders.

3. The anti-vibration device according to claim 2, wherein a step which is to be engaged with the end portion of the inner cylinder is formed at a peripheral edge portion of the guide member.

4. The anti-vibration device according to claim 2, wherein a gap which allows movement of the inner cylinder in a direction normal to the central axis thereof is provided between the guide member and the outer ring.

5. The anti-vibration device according to claim 1, wherein the end plate is provided with a tubular portion protruding from a peripheral edge portion thereof toward an outer periphery side of the rubber-like elastic body, and a gap is provided between the tubular portion and the rubber-like elastic body.

6. The anti-vibration device according to claim 5, wherein the tubular portion is placed at a position where its front end overlaps the outer ring in the radial direction of the inner cylinder, and is made to act as a stopper which comes into abutment with the outer ring to limit the movement of the inner cylinder in the direction of the central axis thereof.

7. An anti-vibration device, comprising: an inner cylinder attached to an engine-side member; an outer cylinder disposed outside the inner cylinder and attached to a frame-side member; and a rubber-like elastic body disposed between the inner cylinder and the outer cylinder, wherein a guide member is coaxially provided to one of the inner cylinder and the outer cylinder so as to face and abut the other at least in part thereof in a radial direction normal to a central axis of the inner cylinder and guide the inner cylinder in a direction of the central axis when the inner cylinder moves as the engine-side member of an engine vibrates.

8. The anti-vibration device according to claim 1, wherein the guide member abuts said one of the inner cylinder and the outer ring along an entire circumferential direction of the guide member.

9. The anti-vibration device according to claim 7, wherein the guide member abuts said one of the inner cylinder and the outer ring along an entire circumferential direction of the guide member.

* * * * *